E. Doe,
Steam Throttle Valve.
Nº 57,879.     Patented Sep. 11, 1866.
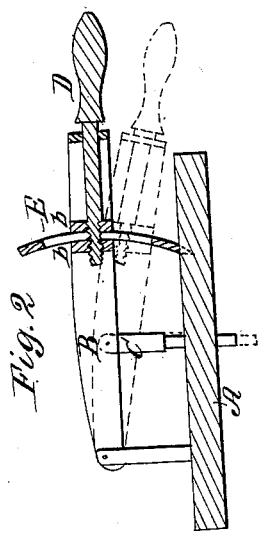
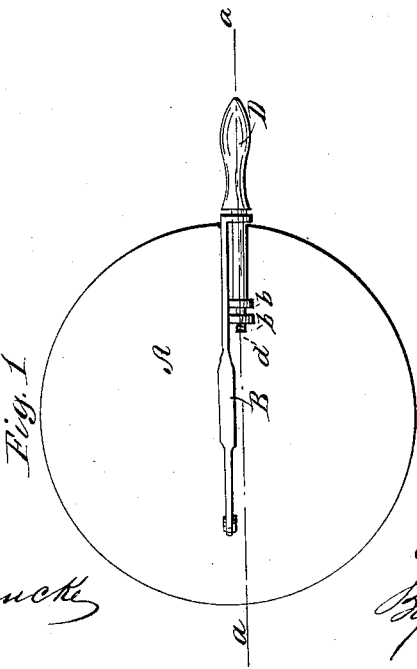
Witnesses
Alex. A. C. Klancke
W. F. Hall
Inventor
Edson Doe
By Munn & Co
Attys.

UNITED STATES PATENT OFFICE.

EDSON DOE, OF NEWBURY, VERMONT.

IMPROVEMENT IN THROTTLE-VALVE LEVERS.

Specification forming part of Letters Patent No. 57,879, dated September 11, 1866.

*To all whom it may concern:*

Be it known that I, EDSON DOE, of Newbury, in the county of Orange and State of Vermont, have invented a new and useful Improvement in Locomotive-Throttles; and I do hereby declare the following to be a full, clear, and exact description of the nature, construction, and operation of the same, reference being had to the accompanying drawings, which are made a part of this specification, and in which—

Figure 1 represents an elevation of the end of the boiler with my improved device applied. Fig. 2 is a central section of the same on the the line *a a*, Fig. 1.

Similar letters of reference indicate corresponding parts in the two figures.

My invention consists in the attachment to the throttle-lever of a handle which is grasped by the hand, to enable the lever to be turned into any position, and rotated to release said lever or retain it in any position to suit the adjustment of the throttle, as will be presently fully explained.

In order that others skilled in the art to which my invention appertains may be enabled to fully understand and use the same, I will proceed to describe it in detail in connection with the accompanying drawings.

A represents the end of the boiler, to which the lever B is pivoted in customary manner, to enable the throttle-valve to be operated by the engineer. The lever B is pivoted to the rod C, which is connected with the throttle-valve.

The ordinary way of adjusting and holding the throttle-lever is by means of a separate thumb-screw, which cannot be manipulated with facility or by the same hand which adjusts the lever.

I provide the lever B with a handle, D, which rests freely in the lug on the extremity of the lever B, and has its threaded end *d* inserted through the slotted segment E and through the lugs *b b*, which are formed on the lever B, and embrace either side of the segment E.

The segment E is fixed rigidly to the end of the boiler A, and serves as a fixture to which the lever B may be adjusted in any desired position to regulate the throttle by means of the handle D. Thus, when it is necessary to retain the lever B at a certain point on the segment E the handle D is grasped by the hand, and, with the lever, is turned into the desired position. Then, with the same hand, the engineer rotates the handle D, and thereby clamps the lugs *b b* against the opposite faces of the segment E, and thereby retains the lever immovably. A reverse rotation of the handle D releases the lever B, and permits it to be readjusted and held as occasion may require.

The threaded handle D, attached to the lever B in the manner described, enables the throttle to be adjusted and held with the greatest facility, and its advantages will be appreciated by those who have the control of the steam mechanism of locomotives.

Having thus described my invention, the following is what I claim as new and desire to secure by Letters Patent:

The handle D, formed with a threaded extremity, and employed, in connection with the throttle-lever, substantially as and for the purposes herein specified.

EDSON DOE.

Witnesses:
  A. G. BUTTON,
  C. STEVENS.